(12) United States Patent
Rucker et al.

(10) Patent No.: US 7,219,620 B2
(45) Date of Patent: May 22, 2007

(54) TIMED FOOD-FILLED TOY DISPENSER

(75) Inventors: David N. Rucker, Berkeley, CA (US); Sandi L. Thompson, Berkeley, CA (US)

(73) Assignee: Dogopolis, LLC, Berkeley, CA (US)

( * ) Notice: Subject to any disclaimer, the term of this patent is extended or adjusted under 35 U.S.C. 154(b) by 196 days.

(21) Appl. No.: 10/645,635

(22) Filed: Aug. 22, 2003

(65) Prior Publication Data

US 2004/0040519 A1 Mar. 4, 2004

Related U.S. Application Data (63) Continuation of application No. 09/944,952, filed on Sep. 1, 2001.

(51) Int. Cl.
*A01K 1/00* (2006.01)
*A01K 5/00* (2006.01)
*A01K 39/00* (2006.01)
*G04C 23/00* (2006.01)

(52) U.S. Cl. .................... 119/51.12; 119/905; 119/707; 119/51.01; 222/650

(58) Field of Classification Search ............ 119/51.15, 119/51.01, 51.04, 51.11, 51.13, 51.14, 707, 119/905, 51.12; 222/650
See application file for complete search history.

(56) References Cited

U.S. PATENT DOCUMENTS

| | | |
|---|---|---|
| 3,720,186 A | 3/1973 | O'Rourke |
| 3,874,341 A | 4/1975 | Riba |
| 3,946,702 A | 3/1976 | Mazzini |
| 4,203,413 A | 5/1980 | Hodges |
| 4,267,799 A | 5/1981 | Bacon |
| 4,337,728 A | 7/1982 | Van Gilst et al. |
| 4,501,229 A | 2/1985 | Williamson |
| 4,617,874 A | 10/1986 | Zammarano |
| 4,671,210 A | 6/1987 | Robinson et al. |
| 4,733,634 A | 3/1988 | Hooser |

(Continued)

FOREIGN PATENT DOCUMENTS

GB 2 037 140 10/1979

(Continued)

*Primary Examiner*—Andrea Valenti
(74) *Attorney, Agent, or Firm*—Hoffman, Wasson & Gitler, P.C.

(57) ABSTRACT

A dispensing system (200) for chewable pet toys (100) contains multiple toys and dispenses them at intervals determined by one or more modes of operation. A display (220) and keypad (400) are used to enter programming data into the memory of a microprocessor (315). When the system is in operation, the display indicates progress through the program, the mode of operation whether MANUAL, RANDOM, or BMOD (behavior modification), the time elapsed, and the number of toys remaining. At various times, sounds emanate from a loudspeaker (320), vibration emanates from a vibrator (328), light emanates from a light source (325), and odor emanates from an odor generator (327). Toys are dispensed down a ramp (225), at predetermined times, or at predetermined times modified by random numbers. Predetermined dispensations permit modification of the pet's behavior (BMOD). Random variations on a predetermined schedule of dispensations (RANDOM) prevent the pet from memorizing a schedule. Multiple, simultaneous dispensations or jackpots reward the pet and maintain the pet's level of interest in the dispensing system. The various stimuli along with the dispensing-time modes prevent habituation and keep the pet interested, contented, and stimulated.

6 Claims, 9 Drawing Sheets

U.S. PATENT DOCUMENTS

| | | | |
|---|---|---|---|
| 4,889,077 A | 12/1989 | Possis | |
| 5,143,289 A | 9/1992 | Gresham et al. | |
| 5,230,300 A * | 7/1993 | Mezhinsky | 119/51.11 |
| 5,239,943 A | 8/1993 | Kim | |
| 5,299,529 A * | 4/1994 | Ramirez | 119/51.11 |
| 5,588,394 A * | 12/1996 | Balistreri | 119/51.11 |
| 5,819,690 A | 10/1998 | Brown | |
| 5,832,877 A | 11/1998 | Markham | |
| 5,894,815 A | 4/1999 | Hamilton | |
| 5,947,061 A | 9/1999 | Markham et al. | |
| 6,082,299 A * | 7/2000 | Halford | 119/51.04 |
| 6,082,300 A | 7/2000 | Futch | |
| 6,125,082 A * | 9/2000 | Reid | 368/10 |
| 6,158,391 A | 12/2000 | Simonetti | |
| 6,237,538 B1 | 5/2001 | Tsengas | |
| 6,273,027 B1 * | 8/2001 | Watson et al. | 119/712 |
| 6,349,671 B1 * | 2/2002 | Lewis et al. | 119/51.02 |
| 6,367,417 B1 * | 4/2002 | Gal et al. | 119/51.5 |
| 6,584,938 B2 * | 7/2003 | Sherrill et al. | 119/710 |
| 6,694,916 B1 * | 2/2004 | Rucker et al. | 119/51.01 |

FOREIGN PATENT DOCUMENTS

GB 2214329 A * 8/1989

* cited by examiner

TIMED FOOD-FILLED TOY DISPENSER

This invention is a continuation of U.S. patent application Ser. No. 09/944,952, filed on Sep. 1, 2001.

BACKGROUND

1. Field of Invention

This invention relates to pet toy dispensers, in particular those which dispense toys containing food and otherwise amuse and alert a pet by providing various physical stimuli.

2. Prior Art

Challenging and Automated Feeding Systems

When left alone, animals frequently become discontented, bored, and hungry. This is cruel to the animals and leads to behavior problems such as barking, digging, and destructive activities on the part of canines and different problems with other animals. Some prior-art schemes have addressed the problem of unattended feeding of animals.

Hamilton, in U.S. Pat. No. 5,894,815 (1999), shows a boredom-reducing feeding device for caged animals comprising various food-sequestering devices, such as a brush and a dipstick-tube. Hamilton's device presents various challenges to a caged animal such as a primate, but does not delay or space feedings, as is desirable for pets.

Riba, in U.S. Pat. No. 3,874,341 (1975), shows a machine for feeding a pet when the owner is absent. An alarm clock is used to open a door and eject a platform with a pet dish. Only a single feeding event occurs while the owner is absent.

Mazzini, in U.S. Pat. No. 3,946,702 (1976) shows a periodic feeder with a series of rotatable compartments for dispensing the food as the compartments rotate past a hole. Mazzini's system provides more opportunities for feeding than Riba, but it does not address the issue of stress experienced by the animal when it is left alone.

While providing food is desirable, this alone does not provide adequate care for a pet. Riba and Mazzini both teach food-dispensing events that occur at fixed intervals, either with respect to the last event or with respect to the time of day. This allows the animal to become habituated to the feeding event, and thus the automatic feeders do not reduce boredom between events nor provide any relief for a pet's separation anxiety.

Watson, in U.S. Pat. No. 6,273,027 (2001) shows an automatic training device that dispenses food, toys, or other rewards, typically on a fixed time interval as long as undesired behavior is not detected. If undesired behavior, such as barking, is detected, rewards are withheld until the undesired behavior is no longer detected. This device can be effective for targeting specific undesired behaviors but requires the incorporation of behavior detectors, which can be complex, expensive, and overly specific.

In addition, Watson's device may automatically adjust the time interval between regular reward dispensations for the purpose of rationing the available rewards over a given overall time period. This adjustment to the time interval is not designed to increase the pet's interest in the device nor relieve the pet's anxiety at the beginning or the end of the pet owner's absence, when behavior problems for the isolated pet are the most severe.

Figure 1:
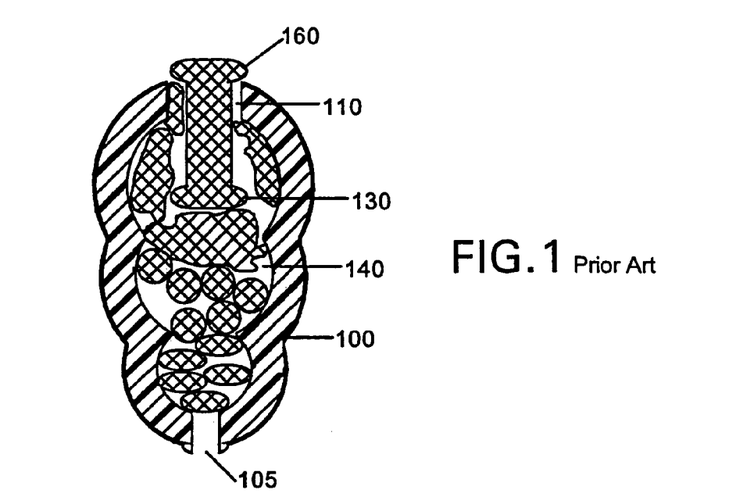
FIG. 1 is a cross-sectional view of a prior-art toy stuffed with food.

Background—Prior-Art—Food-Filled Toys—FIG. 1

Pet chew toys that may be filled with food to be extracted by the pet are well known. Examples of these chew toys are sold under the trademarks Kong by Bounce, Inc. of Golden, Colo., USA, and Rhino by Nylabone, a division of T.F.H. Publications of Neptune City, N.J., USA. Such a toy is also shown in U.S. Pat. No. 5,947,061 (1999) and U.S. Pat. No. 6,129,053 (2000) to Markham et al. This toy has various recesses in its outer surface, as well as a hollow interior. Food treats are deposited in the recesses and interior. Various levels of difficulty in removing the treats are achieved, depending upon the location, density, solubility, adhesion, and so forth, of the food treats and the shape of toy.

A cross-sectional view of one embodiment of the Kong toy is shown in FIG. 1. The body of toy 100 is made of a rugged, semi-elastic material, such as rubber. It is hollow with a first hole 105 at one end (bottom end in drawing) and a second hole 110 at the other end (top end in drawing). The hardness of the rubber comprising toy 100 is about 100 durometer units. A dog's bite can slightly deform toy 100, but not flatten it. Toy 100 is available in various sizes suitable for dogs of different sizes. A typical size is 14 cm long and 8 cm in diameter, at the widest point. The wall thickness is typically 1.5 cm. The diameter of hole 105 at the bottom of toy 100 is typically 1 cm, while the diameter of hole 110 at the top is typically 3.2 cm.

Food 130 of various kinds is stuffed into cavity 140 of toy 100. Food 130 can be dry or wet dog food, fruits, cheese, meat, eggs, peanut butter, and the like. It can be hot, cold, or frozen.

Hole 110 is the primary entrance and exit for food 130. An "appetizer" tidbit 160 (shaped like a bone) projects from hole 110 to entice the dog to begin eating the contents of toy 100.

Food-filled pet chew toys are frequently used to distract and entertain pets prior to an extended absence. The pet's owner typically fills the toy with food and hands the toy to the pet prior to the owner's departure. This is effective in keeping a pet's interest for up to an hour in extracting the food from the chew toy. However, once the food is extracted the remaining time of the pet's isolation is without entertaining stimulation. In the case of a ten-hour absence, as may be expected when a pet owner leaves for work in the morning, this translates to a nine-hour isolation with no entertaining stimulation.

Background—Objects and Advantages

Accordingly, several objects and advantages of the invention are to provide an improved system for feeding a pet, to alleviate boredom, and to reduce stress for the pet while the pet's owner is absent, including the times at the beginning and at the end of an owner's absence when an isolated pet's anxiety is often the highest. Other objects are to provide a system that amuses and entertains the pet by dispensing toys, providing auditory, visual, tactile, and olfactory stimuli at various random intervals to prevent habituation to any one event, or at predetermined intervals biased to reduce separation anxiety without requiring the use of behavior detectors.

Further objects and advantages will become apparent from a consideration of the ensuing description and the accompanying drawings.

SUMMARY

In accordance with the invention, an apparatus and method are provided which dispense food-filled toys at random, unpredictable intervals or at biased predetermined intervals. Within a selected set of random interval dispensations, jackpots, or multiple dispensations of food-filled toys, can occasionally occur at a single dispensation event to further reinforce the pet's interest in the device. Predetermined intervals are biased such that the dispensations occur more frequently after the owner leaves and before the owner returns, when a pet's separation anxiety is the highest. In addition, the system emits sounds, odors, vibrations, and visible signals at random intervals or at predetermined intervals in conjunction with food-filled toy dispensation.

DRAWINGS—REFERENCE NUMERALS

| 100 | Toy | 130 | Food |
| 105 | Hole | 140 | Cavity |
| 110 | Hole | 160 | Appetizer |
| 200 | Dispensing system | 330 | Tray |
| 205 | Lid | 331 | Tray |
| 210 | Thumbscrews | 332 | Tray |
| 215 | Frame | 333 | Tray |
| 220 | Display | 334 | Tray |
| 221 | Cut-out portion | 335 | Tray |
| 225 | Ramp | 340 | Conveyor belt |
| 300 | Threaded shaft | 345 | Pulley |
| 305 | Battery power pack | 350 | Pulley |
| 310 | Power switch | 400 | Keypad |
| 315 | Microprocessor | 405 | Key |
| 320 | Loudspeaker | 410 | Key |
| 324 | Motor | 415 | Key |
| 325 | Light source | 420 | Key |
| 327 | Odor generator | | |
| 328 | Vibrator | | |

Figure 2:
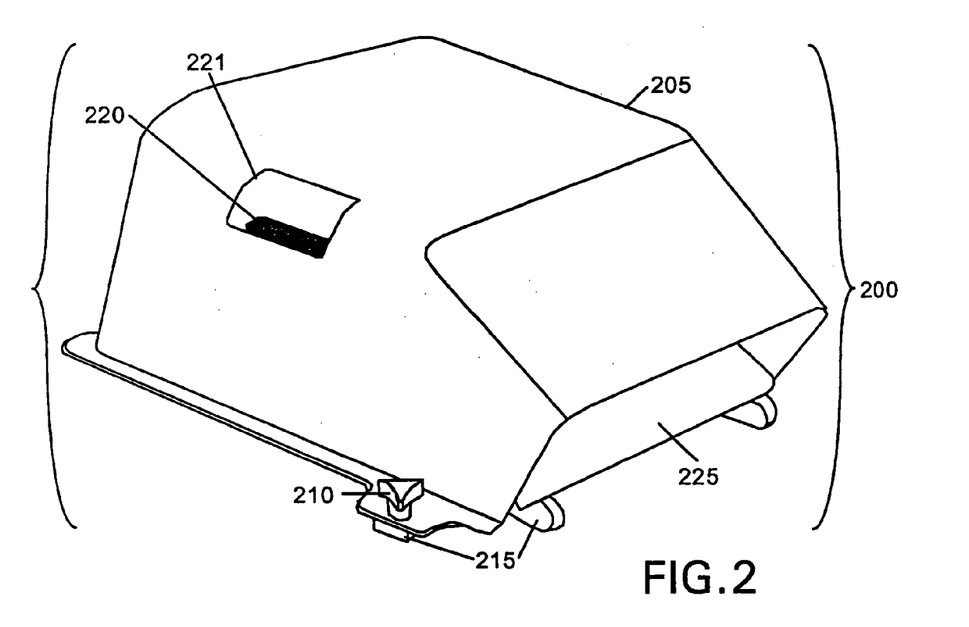
FIG. 2 is a perspective view of a feeding and entertainment system according to the present invention, with a closed lid.
Figure 3:
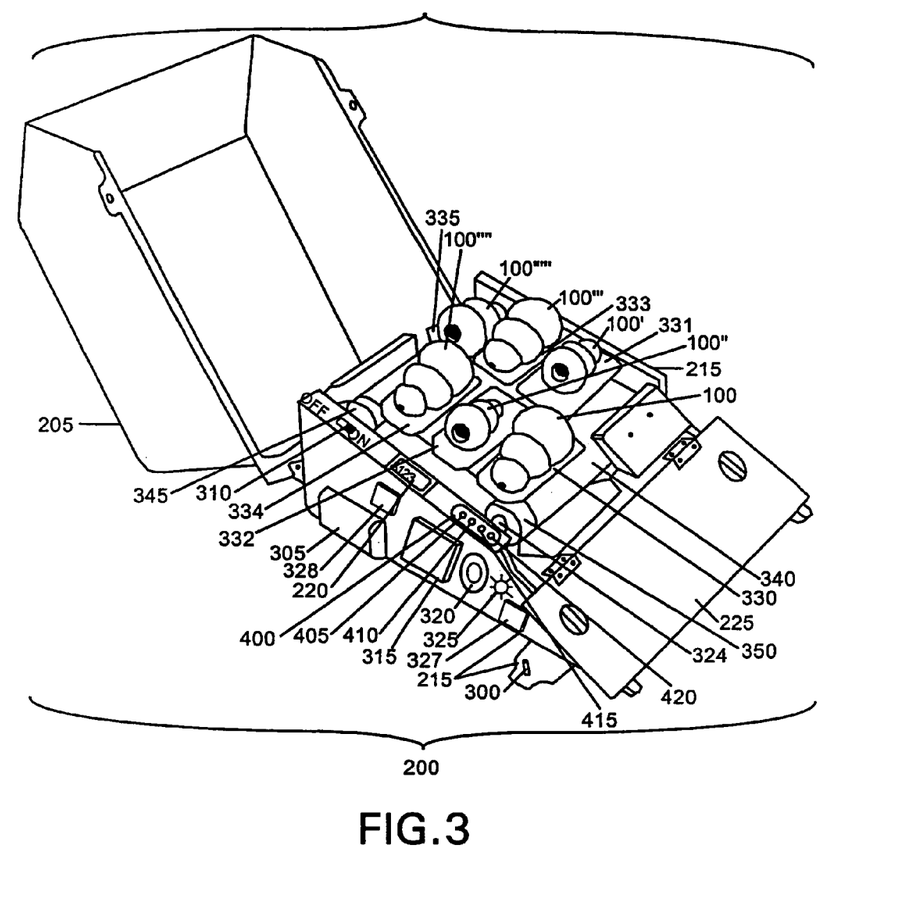
FIG. 3 is a perspective view of the system of FIG. 2 with the lid open.
Figure 4:
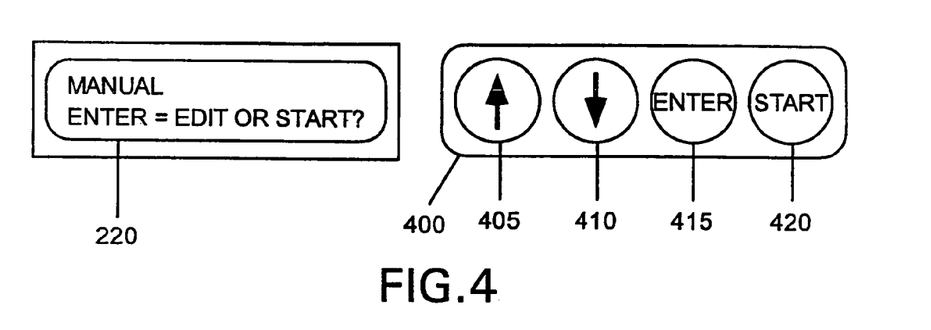
FIGS. 4 through 9 show the display and keypad of the system of FIG. 2 at various stages of data entry.

DETAILED DESCRIPTION—PREFERRED EMBODIMENT—DISPENSING APPARATUS—FIGS. 2 AND 3

FIG. 2 shows a perspective view of a dispensing system 200 according to the invention ready for use. System 200 is covered by a lid 205 which is secured in place by two hand-turned thumbscrews 210 (only one is visible in this view), and is secured to a frame 215, partially visible in this view. An alphanumeric display 220 is visible through a cutout portion 221 of lid 205. Food-filled chew toys 100 through 100'''' (FIG. 3) are dispensed from within system 200 by rolling or tumbling down a ramp 225, as explained below. System 200 is preferably 41 cm wide, 46 cm deep, and 30 cm high.

FIG. 3 shows a perspective view of system 200 with lid 205 open. Threaded shafts 300 (only one is visible in this view) normally hold lid 205 in the closed position, when engaged by thumbscrews 210 (FIG. 2). System 200 contains a battery power pack 305, typically containing four "C"-size batteries (not shown). When power switch 310 is in the "ON" position, power pack 305 energizes a microprocessor 315, display 220, a loudspeaker 320, a motor 324, a light source 325, an odor generator 327, and a vibrator 328. A keypad 400 with buttons or keys 405 (SCROLL UP), 410 (SCROLL DOWN), 415 (ENTER), and 420 (START) communicates between the user (not shown) and microprocessor 315.

Microprocessor 315 contains a program (described below) with timer software and instructions for selectively activating all elements in system 200.

Food-filled chew toys 100 through 100'''' rest on trays 330 through 335. Trays 330–335 are attached to and supported by conveyor belt 340. Belt 340 passes over pulleys 345 and 350. Motor 325 causes belt 340 to move over pulleys 345 and 350. Each toy 100 may be approximately 14 cm long and 8 cm in diameter and may contain approximately 1/16 liter of food for a typical medium-size dog of 20 kg. Of course the size and internal volume of the toy 100 should be modified for larger or smaller pets.

Operation—Preferred Embodiment—FIGS. 4 through 11D

When the system is energized, instructions (described below) are entered into the memory (not shown) of microprocessor 315 by pressing keys 405 (SCROLL UP), 410 (SCROLL DOWN), 415 (ENTER), and 420 (START) on keypad 400. During entry of instructions, programming (described below) in microprocessor 315 causes its responses to these keystrokes to be displayed on display 220. These instructions enable and modify various commands stored in the memory of microprocessor 315. Pressing key 405 (SCROLL UP) causes display 220 to scroll upward through various options. Pressing key 410 (SCROLL DOWN) causes display 220 to scroll downward through various options. In the presently preferred embodiment, the three timing options available are "MANUAL", "RANDOM", and "BMOD" (described below). If RANDOM is displayed and the user wishes to select MANUAL, then the user presses key 405 (SCROLL UP) once and display 220 shows MANUAL. If instead user had pressed key 410 (SCROLL DOWN) twice, the selection MANUAL would still appear, and so forth.

Acting upon commands from microprocessor 315 (FIG. 3), motor 325 moves belt 340, display 220 changes, loudspeaker 320 emits sounds, light source 325 emits light, odor generator 327 emits odors, and vibrator 328 vibrates. In addition, programming in microprocessor 315 determines the times at which these various events occur. The times are selected from among three timing modes, which are as follows:

Description of the Timing Modes

Random—In the RANDOM mode, the user chooses the total number of toys 100 to be dispensed and the time period over which the total number of toys 100 will be dispensed. The program stored in the memory of microprocessor 315 automatically causes motor 325 to advance belt 340 the width of one tray 330–335 at random times throughout a selected time period, dispensing one toy 100 per event. At certain dispensation events, the program stored in the memory of microprocessor 315 automatically causes motor 325 to advance belt 340 the width of two trays 330–335, dispensing two toys 100 to provide a jackpot.

The RANDOM timing mode is used because the animal will stay interested in the long term if it can not memorize a pattern of dispensation of toys 100. A pet's interest is further maintained by occasionally providing a jackpot of two toys 100 dispensed at a single dispensation event.

Behavior Modification (BMOD)—In the BMOD mode, the number of toys 100 is preset at six. The user selects a time period between 4 hours (4:00) and 9 hours 50 minutes (9:50). The program stored in the memory of microprocessor 315 causes system 200 to dispense toys 100 according to the schedule in Table I. Times are measured after the user presses key 415 (START).

TABLE I

| TOY DISPENSED | TIME OF DISPENSING |
| --- | --- |
| Toy #1 (100) | 10 minutes after START key 415 is pressed |
| Toy #2 (100') | 40 minutes after START key 415 is pressed |
| Toy #3 (100") | 100 minutes after START key 415 is pressed |
| Toy #4 (100''') | 100 minutes prior to end of time period |
| Toy #5 (100'''') | 40 minutes prior to end of time period |
| Tpy #6 (100''''') | 10 minutes prior to end of time period |

Many behavior problems occur shortly after a separation (e.g., the pet's owner leaves for work), and shortly before an expected return (e.g., the pet's owner returns from work). This mode distributes toys 100 at these intervals to ameliorate such problems.

Manual—In the MANUAL mode, the user selects the number of toys 100 and the time delay for the dispensing of each toy 100. For example, the user may choose to dispense six total toys 100 according to the schedule in Table II.

TABLE II

| TOY DISPENSED | TIME OF DISPENSING |
| --- | --- |
| Toy #1 (100) | 1 hour 10 minutes after START key 415 is pressed |
| Toy #2 (100') | 2 hours 40 minutes after START key 415 is pressed |
| Toy #3 (100") | 3 hours 0 minutes after START key 415 is pressed |
| Toy #4 (100''') | 4 hours 50 minutes after START key 415 is pressed |
| Toy #5 (100'''') | 5 hours 20 minutes after START key 415 is pressed |
| Toy #6 (100''''') | 6 hours 30 minutes after START key 415 is pressed |

Considerations for the Pet Owner in Selecting a Timing Mode

If the goal of the owner is to feed and entertain a pet throughout an extended absence, and the pet either exhibits few behavior problems or behavior problems which are not characteristically exhibited at the beginning or end of an owner absence, the RANDOM mode should be selected. The RANDOM mode dispenses toys dispersed over an overall time period, but at unpredictable intervals that reinforce a pet's interest by variable reinforcement. The RANDOM mode also incorporates the occasional multiple dispensation, or "Jackpot" to further reinforce interest. This variable reinforcement works to capture a pet's interest much as slot machines capture human interest.

If the owner finds that a pet exhibits separation related behavior problems, such as barking, scratching, and inappropriate soiling, then the BMOD (Behavior Modification) mode should be selected. Separation related behavior problems typically occur at the beginning and the end of an owner absence, and these are the periods that the BMOD mode dispenses toys 100. These toy 100 dispensations can serve to distract the pet with non-destructive entertainment at the times of peak anxiety.

If the owner would like dispensations to occur at specific times during a day, for example 3:05 PM, then the MANUAL mode should be used. The MANUAL mode is useful to schedule dispensations for specific times when external events occur which may disturb or excite a pet, such as the known arrival of a delivery person or a scheduled (and noisy) garbage pickup. The MANUAL mode is also useful to arrange the repeated simultaneous dispensing of multiple toys 100, as in the case in which it is desired to dispense two toys 100 at three selected times for the purpose of providing sufficient toys for a two-dog household.

Operation of Keypad 400 and Display 220—Entry of Instructions—FIGS. 5 Through 9

When system 200 is first energized, the program in microprocessor 315 presents the user with a selection and a choice. "RANDOM", for random timing mode, is displayed. This is the "main screen", or starting point of the program. The user can press START key 420 to begin execution of a previously established program sequence. Alternatively, the user can press ENTER key 415 to cause the program in the memory of microprocessor 315 to edit the program sequence.

Figure 5:
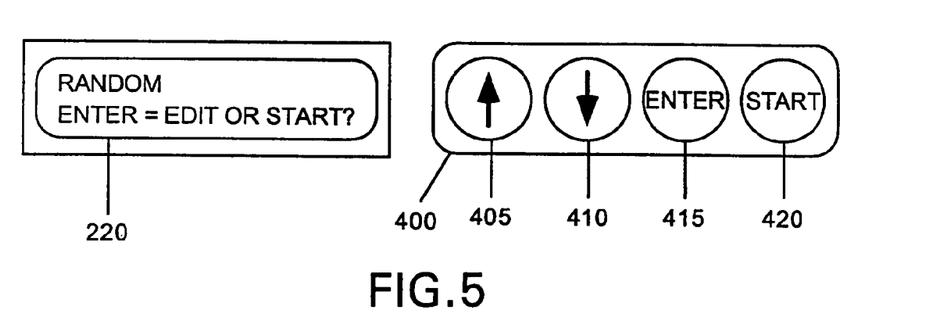

Selecting the timing mode—FIG. 5—To edit the program sequence, the User presses ENTER key 415. Then the user presses up-arrow or down-arrow keys, 405 and 410 respectively, to select the desired timing mode, RANDOM, BMOD, or MANUAL. When the desired timing mode is shown on display 220, the user presses ENTER key 415. In the present example, RANDOM has been selected.

Figure 6:
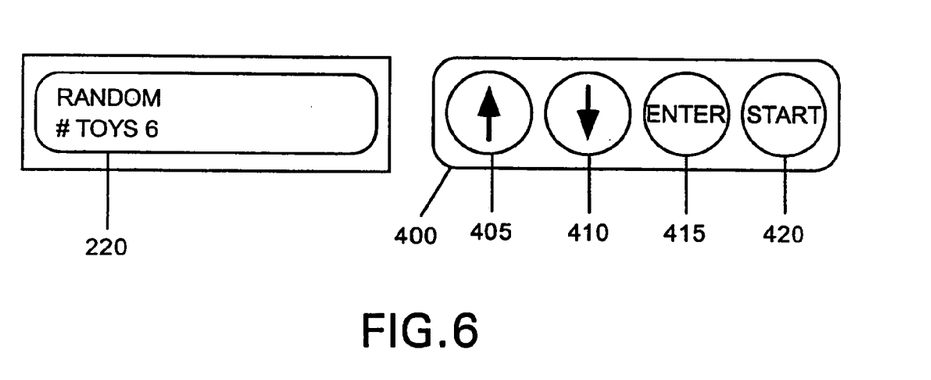

Selecting the number of toys to be dispensed—FIG. 6—Display 220 now shows the timing mode, RANDOM, and the number of toys 100 to be dispensed. Up and down-arrow keys 405 and 410 are pressed, causing display 220 to increment and decrement the value shown adjacent "# TOYS" shown on display 220. Numbers between 1 and 6 can be selected. If up-arrow key 405 is pressed when # TOYS equals 6, then # TOYS rolls over to 1. Similarly, if down-arrow key 410 is pressed when # TOYS equals 1, then # TOYS rolls over to 6. Once the desired number of toys 100 is displayed, the user presses ENTER key 415. The number of toys 100 to be dispensed in MANUAL mode is selected with the same method as in RANDOM mode.

In the BMOD mode, only six toys 100 are allowed. If the user has previously selected BMOD, # TOYS is automatically set to 6, loudspeaker 320 beeps twice, and the user is prompted to enter a time period.

Figure 7:
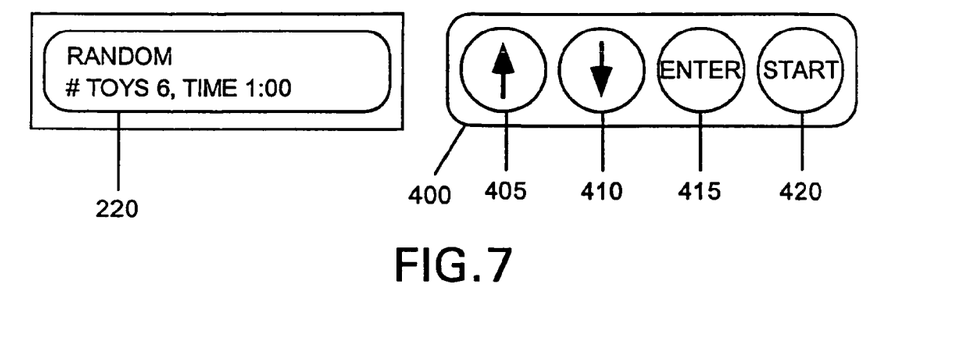

Selecting the time period for RANDOM and BMOD modes—FIG. 7—After the selection of timing mode and number of toys 100 to be dispensed, display 220 then shows a time period over which the toys 100 are to be dispensed.

When the RANDOM mode has been selected, time periods from one hour (1:00) to 9 hours 50 minutes (9:50) are available. When BMOD has been selected, time periods from 4 hours (4:00) to 9 hours 50 minutes (9:50) are available.

The user presses up and down-arrow keys 405 and 410 to select the desired time period. When the desired time period is shown on display 220, the user presses ENTER key 415 once to accept it.

Figure 8:
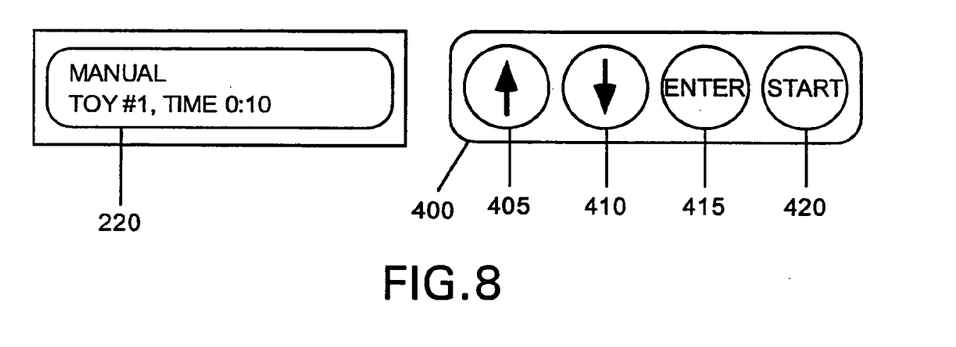
Figure 9:
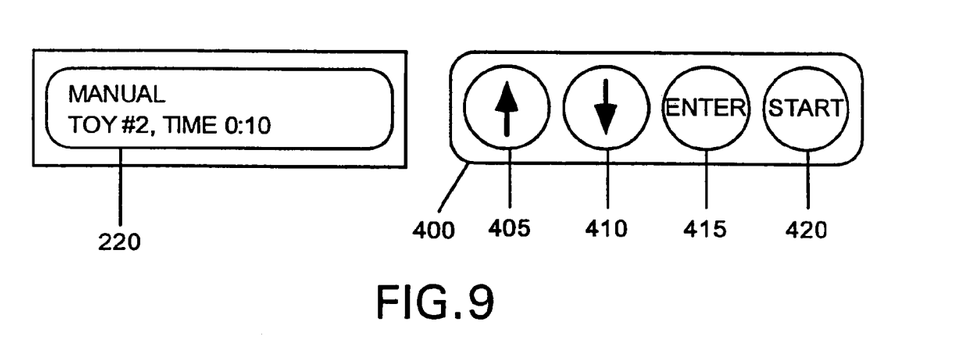

Selecting the time period for MANUAL mode—FIGS. 8 and 9—After the MANUAL timing mode and number of toys 100 are selected, display 220 appears as shown in FIG. 8. The time indication shows the delay between the pressing of START key 420 and dispensing of the first toy 100. The delay time is adjusted by pressing up and down-arrow keys 405 and 410, and selected by pressing ENTER key 415 once.

After ENTER key 415 has been pressed, display 220 updates to show the time indication for toy 100'. The delay time for toy 100' is the time delay between dispensing of toy 100' and the pressing of the START key 420, and is selected as above. The process is continued until times have been selected for all toys to be dispensed.

Figure 10:
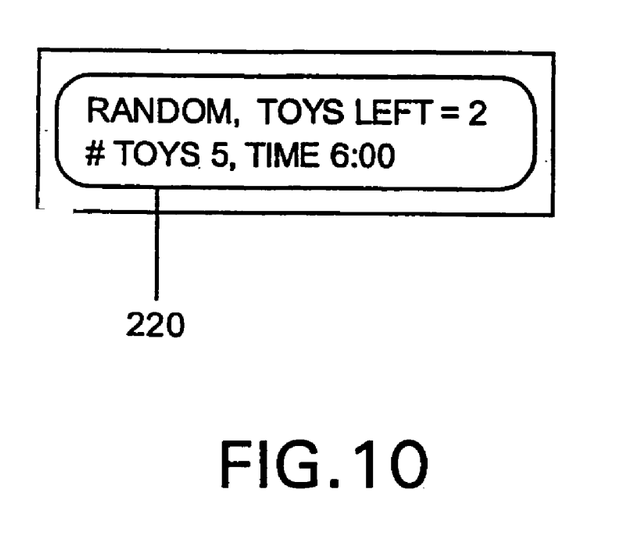
FIG. 10 shows the display of the system of FIG. 2 at one time during operation.

Monitoring the progress through the selected settings—FIG. 10—Lid 205 (FIG. 2) is closed while system 200 is operating. Cut out portion 221 in lid 205 allows the user to view progress through the various selections on display 220.

An example of a progress indication on display 220 is shown in FIG. 10. The timing mode is RANDOM, the # TOYS is five, the elapsed TIME from the start of the program is six hours, and the number of TOYS LEFT to dispense is two.

After all toys are dispensed, or if there has been an error in operation, display 220 will return to the original main screen.

Program Flow Chart—FIGS. 11A Through D—Setting up System 200 for RANDOM Mode Operation.

Figure 11A:
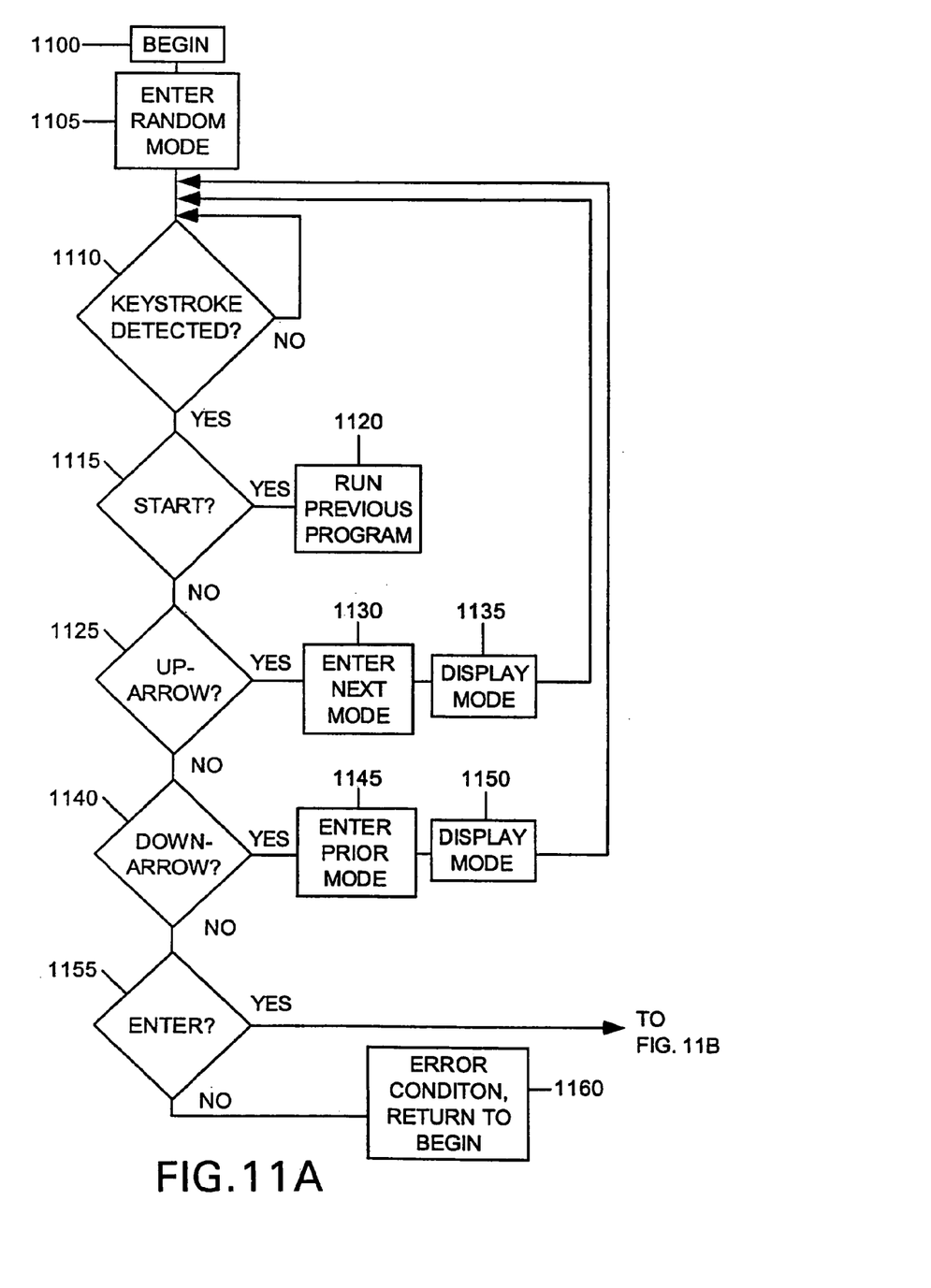
FIGS. 11A through 11D are a flowchart showing the process of entering data and running the system of FIG. 2.

When system 200 (FIG. 3) is energized, the program in microprocessor 315 begins at BEGIN (block 1100, FIG. 11A). After starting, the program automatically enters the RANDOM mode of operation (block 1105). Then the program waits for a keystroke (block 1110). When a keystroke on keypad 400 is detected, the program checks to see which of keys 405 through 420 was pressed. If START key 420 was pressed (block 1115), the previously stored program is run (block 1120). If up-arrow key 405 was pressed (block 1125), then the program enters the next mode of operation (e.g. MANUAL) (block 1130) and displays "MANUAL" on display 220 (block 1135). If down-arrow key 410 was pressed (block 1140), then the program enters the prior mode of operation (e.g. BMOD) (block 1145) and displays "BMOD" on display 220 (block 1150). In this example, up and down-arrow keys 405 and 410 are pressed until the RANDOM mode of operation is displayed.

When ENTER key 415 is pressed (block 1155), the program remains in the RANDOM mode of operation and waits for the next keystroke. If a keystroke is detected (block 1110), but none of keys 405 through 420 was pressed, an error condition exists (block 1160) and the program returns to BEGIN (1100), awaiting further instructions.

When the next keystroke is detected (block 1165, FIG. 11B), the program again tests to see which of keys 405, 410, 415, and 420 was pressed. If START key 420 is detected (block 1170) at this point, this keystroke is ignored, since it is not a usable instruction. The program then waits for another keystroke (block 1165). If the next keystroke is from up-arrow key 405 (block 1175), then the number of toys is incremented (block 1180) and displayed on display 220 (block 1185). The program then waits for another keystroke (block 1165). If the next keystroke is from down-arrow key 410 (block 1190), then the number of toys is decremented (block 1195) and displayed on display 220 (block 1200). The program then waits for another keystroke (block 1165). In incrementing # TOYS, the program rolls over from six toys to one. In decrementing # TOYS, the program rolls under from one toy to six, as described above.

Figure 11B:
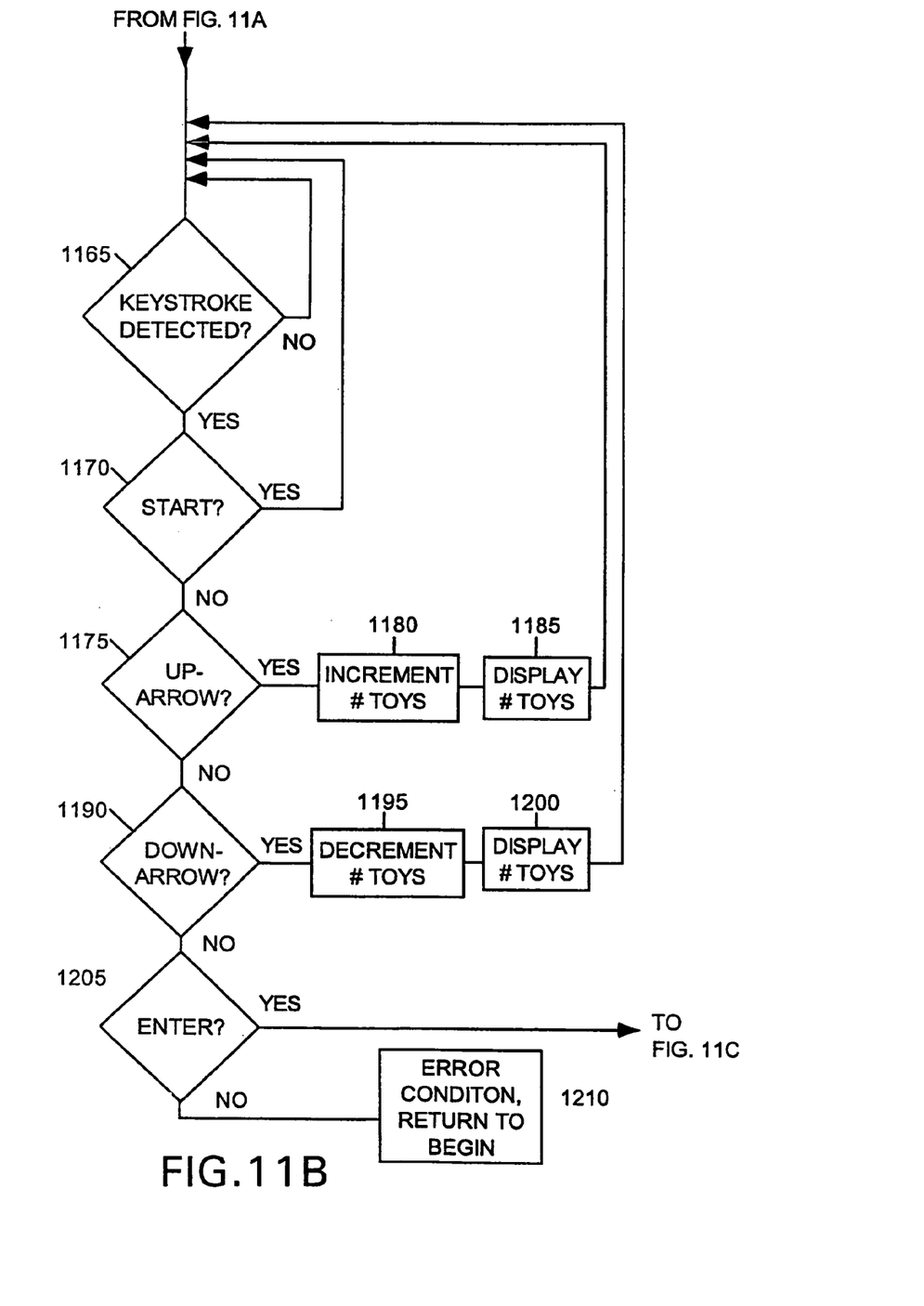
Figure 11C:
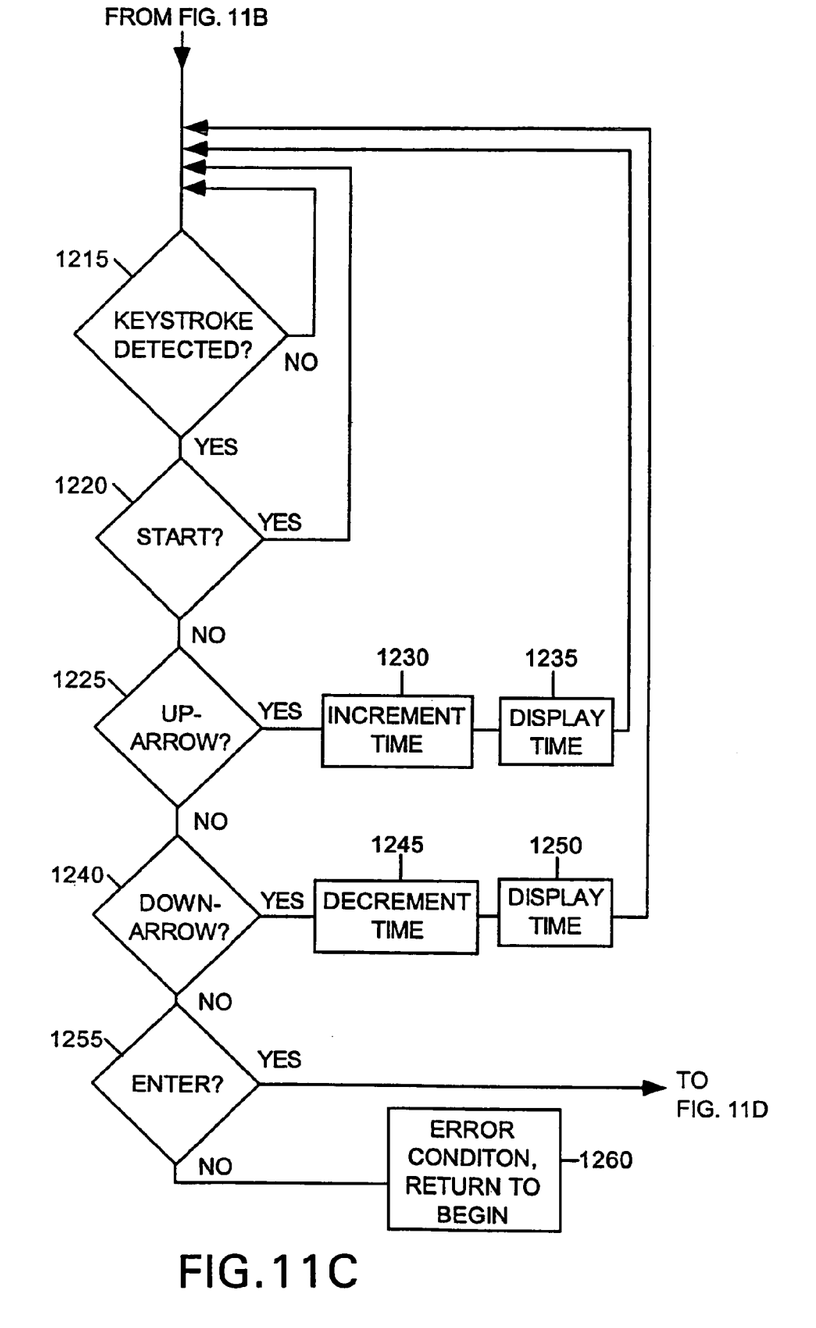

After the desired number of toys is displayed, the user presses ENTER key 415. Again, if a keystroke is detected (block 1165), but none is found, an error condition exists (block 1210), and program execution returns to BEGIN (block 1100).

The next step is to enter the overall time for all dispensations. When the next keystroke is detected (block 1215, FIG. 11C), it is decoded as before. A START key-press is ignored at this point, since it is again not a usable instruction. Pressing up-arrow key 405 (block 1225) increments (block 1230) and displays (block 1235) the first time value. Pressing down-arrow key 410 (block 1240) decrements (block 1245) and displays (block 1250) the first time value. Pressing and decoding ENTER key 415 (block 1255) causes the program to advance to the next step—waiting for another keystroke.

Figure 11D:
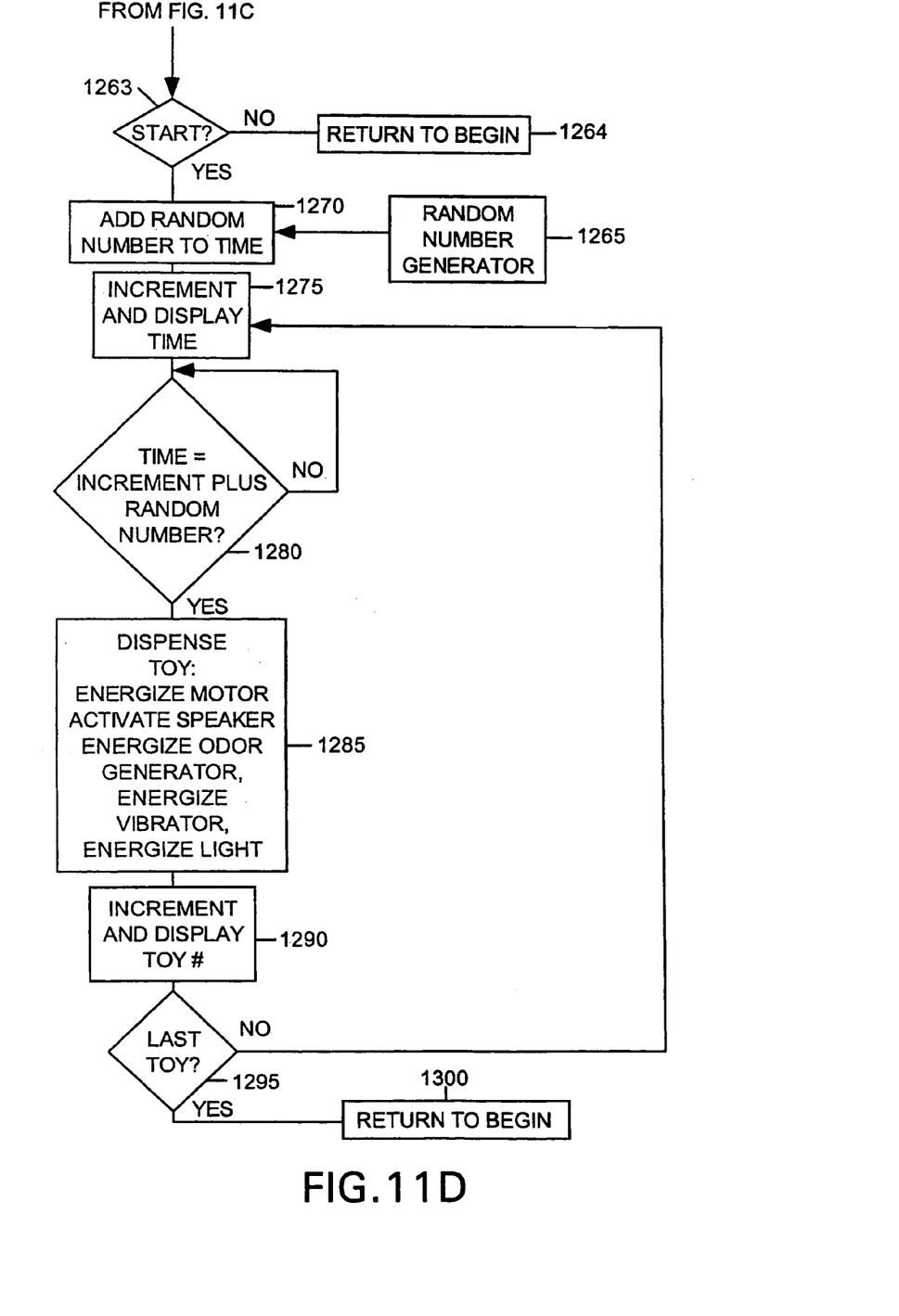

At this point, randomly distributed dispensation times are generated (block 1265, FIG. 11D), as follows:

Step 1: A fixed time interval is calculated by dividing the overall time entered above by the total number of toys entered above. For example, if the pet will be alone for six hours and the system contains six toys, the time interval is one hour.

Step 2. A random number generator, well known to those skilled in the art of computer programming, is used to generate one random number between zero and one for each toy. These are $RND_1, \ldots, RND_N$. For example for six toys, $RND_1=0.20$, $RND_2=0.35$, $RND_3=0.70$, $RND_4=1.00$, $RND_5=0.00$, $RND_6=0.64$. As an alternative to a random number generator, an array (not shown) of numbers between zero and one can be stored in memory of a microprocessor 315, the array being a large set of numbers, for example two-hundred numbers, which can be used sequentially as required. Eventually, the set of numbers will be exhausted, at which point the array recycles and numbers are again selected from the beginning of the array. Any repetitions in program dispensations would be well spaced, for example more than 30 programs apart, effectively precluding memorization of any given program sequence by the pet.

Step 3. Beginning when the user presses "START" (block 1263), toys will be dispensed at times $T_1, \ldots, T_6$, measured from when the user presses the START key 420 and determined according to the following formula:

$$T_N=(N-1)(\text{Interval})+(RND_N)(\text{Interval}).$$

Thus:
$T_1=(0)(1)+(0.20)(1)=0.2$ hour
$T_2=(1)(1)+(0.35)(1)=1.35$ hours
$T_3=(2)(1)+(0.70)(1)=2.7$ hours
$T_4=(3)(1)+(1.00)(1)=4.00$ hours
$T_5=(4)(1)+(0.00)(1)=4.00$ hours
$T_6=(5)(1)+(0.64)(1)=5.64$ hours Note that because the generation of random numbers is biased toward selecting "1.00" and "0.00", occasionally a jackpot results in which two toys are dispensed at the same time. In the example above, toy 4 and toy 5 are scheduled to dispense at the same time.

System 200 now expects a START command. If any key other than START 420 is pressed (block 1263, FIG. 11D), program control returns to BEGIN (block 1100). If START key 420 is pressed, then a time counter (not shown) increments and displays the time which has elapsed since the pressing of START key 420. The program selects the first value from the array of time values calculated above and waits (block 1280) until the current time equals the first time value.

When the time value equals the time interval since pressing START key 420, a toy 100 is dispensed. Motor 324 (FIG. 3) is activated for a time sufficient to advance belt 340 a distance sufficient to tilt tray 330 enough to cause toy 100 to roll or tumble down ramp 225. At this time, speaker 320 can emit sounds, odor generator 327 can emit odors, light source 325 can emit light or project an image, and vibrator 328 can vibrate. All of these supplementary stimuli are used to entertain the pet.

After the first toy 100 is dispensed, the TOY # is incremented and displayed (block 1290) on display 220. The program then checks to see if the last of toys 100 has been dispensed. The number of the current toy 100 to be dispensed is compared with the number entered above. If the last toy has not been dispensed, the program returns to block 1275 to continue the dispensing and stimulating process. When two dispensing times are equal, one toy is dispensed immediately following the previous dispensed toy, resulting in a jackpot. If the last toy has been dispensed, program control goes to block 1264 and then returns to BEGIN (block 1100) and the dispensing and stimulating process terminates.

CONCLUSION, RAMIFICATIONS, AND SCOPE

Accordingly the reader will see that, according to the invention, I have provided a superior dispenser for a pet toy. The novel dispenser uses randomized or predetermined intervals in dispensing toys, and accompanies the toys with a variety of stimuli, including sound, vibrations, light, and odors. A pet cannot memorize the randomized intervals and become habituated to the dispensation events. Thus the pet will remain interested between events. Interest is increased further with the addition of the occasional jackpot in which multiple toys are dispensed at a particular dispensation event.

Alternatively, the pet's behavior can be modified through controlled timing of dispensations. Predetermined intervals are biased such that the dispensations occur more frequently after the owner leaves and before the owner returns, when a pet's separation anxiety is the highest. This has the effect of mitigating separation anxiety and providing alternatives to destructive behaviors at the times when the pet's anxiety is the strongest.

While the above description contains many specificities, these should not be construed as limitations on the scope of the invention, but as exemplifications of the presently preferred embodiments thereof. Many other ramifications and variations are possible within the teachings of the invention. For example, the dispensing system can dispense toys that contain medications that the animal must consume in order to reach the food treat inside the toy. Although the embodiment shown dispenses six toys, other embodiments can dispense more or fewer toys. The system frame and cover can be made of sheet metal, plastic, or wood, or a combination of materials. The system can be made to attach to a tabletop to discourage pets from digging into the area where the toys are staged prior to dispensing. It can be for non-canine pets, such as felines, horses, apes, and the like. The time intervals given are exemplary and can be changed to much shorter or longer intervals, even days or weeks if the pet owner is to be away on a trip. The dispenser can dispense individual pieces of food, without an accompanying toy. The toys can be without a comestible and/or can be varied in shape and operation from the exemplary toy shown. For example, the toy may be spherical, cubical, or bone-shaped with suitable food apertures. Thus the scope of the invention should be determined by the appended claims and their legal equivalents, and not by the examples given.

We claim:

1. A method of dispensing a preselected plurality of pet treats from a container including a microprocessor provided with a program, and an input device allowing a user to enter a predetermined plurality of dispensing times during a predetermined time period, comprising the steps of:
    signaling to the microprocessor through use of said input device, said microprocessor utilizing the program to calculate a schedule to dispense said pet treats;
    calculating, through the use of said program provided within the microprocessor, said schedule to dispense said pet treats during said predetermined time period at a predetermined plurality of dispensing times which are pseudo-random and sufficiently spaced, said predetermined time period is divided into equal intervals, wherein the number of said equal intervals is equal to said predetermined plurality of dispensing times, a pet treat will be dispensed in a majority, but not all of said respective equal intervals, to maintain a pet's interest over said predetermined time period; and
    dispensing said pet treats according to said schedule.

2. The method of claim 1 wherein said pet treats are pet comestibles.

3. The method of claim 1 wherein said pet treats are pet toys.

4. The method of claim 3 wherein said pet toys each contain a pet comestible.

5. The method of claim 1 wherein a plurality of said pet treats are dispensed in rapid succession.

6. The method of claim 1, further including the step of producing a audio signal prior to the dispensing of at least one of said pet treats.

* * * * *